US006790144B2

(12) United States Patent
Talesky

(10) Patent No.: US 6,790,144 B2
(45) Date of Patent: Sep. 14, 2004

(54) FLEXIBLE SHAFT PLUG INSERT

(75) Inventor: Mark S. Talesky, Huntley, IL (US)

(73) Assignee: Credo Technology Corporation, Wilmington, DE (US)

(*) Notice: Subject to any disclaimer, the term of this patent is extended or adjusted under 35 U.S.C. 154(b) by 166 days.

(21) Appl. No.: 10/122,294

(22) Filed: Apr. 12, 2002

(65) Prior Publication Data

US 2003/0192712 A1 Oct. 16, 2003

(51) Int. Cl.[7] .................................................. F16D 3/12
(52) U.S. Cl. ............................. 464/53; 464/57; 173/29
(58) Field of Search ........................... 464/52, 57, 901, 464/53; 173/79

(56) References Cited

U.S. PATENT DOCUMENTS

| | | | | |
|---|---|---|---|---|
| 1,324,787 A | * | 12/1919 | Berge | 464/53 |
| 1,943,980 A | * | 1/1934 | Mall | 464/53 |
| 2,596,335 A | | 5/1952 | Kessler | |
| 2,645,944 A | * | 7/1953 | Crichton, Jr. et al. | 74/15.6 |
| 3,211,485 A | * | 10/1965 | Petersen | 464/52 |
| 3,440,836 A | * | 4/1969 | Petersen | 464/53 |
| 3,587,248 A | | 6/1971 | Umanos | |
| 3,938,354 A | * | 2/1976 | Lehman | 464/52 |
| 4,027,501 A | * | 6/1977 | Hanebuth | 73/527 |
| 4,185,474 A | | 1/1980 | Kulischenko | |
| 4,280,338 A | * | 7/1981 | Shannon et al. | 464/7 |
| 4,335,585 A | * | 6/1982 | Hoff | 464/52 |
| 4,416,644 A | | 11/1983 | Kulischenko et al. | |
| 4,555,238 A | * | 11/1985 | Miller et al. | 464/52 |
| 4,560,365 A | * | 12/1985 | Weaver | 464/52 |
| 4,575,356 A | | 3/1986 | Murohushi et al. | |
| 5,149,302 A | * | 9/1992 | Yano | 464/52 |
| 6,041,571 A | * | 3/2000 | Fields et al. | 53/331.5 |

* cited by examiner

*Primary Examiner*—John Sipos
*Assistant Examiner*—Louis Tran
(74) *Attorney, Agent, or Firm*—Greer, Burns & Crain, Ltd

(57) ABSTRACT

An apparatus for preventing disengagement of an axially movable and rotatable flexible core of a flexible shaft attachment, which has a driven end and a handpiece end, and the driven end has a ferrule for attachment to a rotary power tool. The rotary power tool has an exteriorly threaded hollow output shaft with a first predetermined interior depth for receiving the base end of tool bits that can be used with the power tool, and the flexible shaft attachment has a drive cap attached to the output shaft, and the drive cap has an aperture sized and shaped for receiving the core in fixed rotating engagement. The apparatus includes a generally cylindrical stop plug having an open end portion and a closed end portion, and a cylindrical chamber extending from said open end portion to said closed end portion. The open end portion has an outward extension adapted to engage the end of the output shaft and be held in place by the attached drive cap, and the chamber is capable of receiving the core therein. The distance from the open end portion to said closed end portion is less than the first predetermined interior depth, and the stop plug thereby limiting the depth of penetration of the core in the output shaft.

20 Claims, 7 Drawing Sheets

FLEXIBLE SHAFT PLUG INSERT

BACKGROUND OF THE INVENTION

The present invention generally relates to hand tools and more particularly to an apparatus for preventing disengagement of an axially moveable and rotatable flexible core member of a flexible shaft attachment of the type which has a handpiece on one end, and its other end is coupled to a rotary hand tool.

There has been continued innovation and improvement in the design of power tools, particularly rotary hand tools of the type that are used in woodworking, metal working and the like. Examples of such products are those produced under the Dremel brand by the S-B Power Tool Corporation of Chicago, Ill., which also produces many accessory attachments for such rotary hand tools. The rotary hand tools are generally cylindrical in shape and have a motorized drive unit with a rotary output shaft that is adapted to drive the various rotary tools, such as small saw blades, sander discs, grout removal tools and various shaped cutting tool bits. There are also many accessory attachments that can be used in association with the rotary tools, with the accessory attachments being connected to the stationary nose end portion of the rotary tool via a coupling apparatus. Among such accessory attachments is a flexible shaft attachment that conveniently allows the user to operate the various rotary tool bits around corners or in other remote areas of operation.

While such flexible shaft attachments have been available for many years, the manner in which the flexible shaft attachments are coupled to the tool has been the subject of continuing efforts to provide a simple and effective mechanism for preventing the disengagement of the flexible core member from the handpiece. Thus, the manner in which flexible shaft attachments are presently coupled to rotary tools, while effective, does not prevent disengagement of the flexible core member from the handpiece end under some operating circumstances.

SUMMARY OF THE INVENTION

The present invention is related to a particularly simple and convenient stop plug apparatus for preventing disengagement of the axially moveable and rotatable flexible core member of a flexible shaft attachment from the handpiece end during use. The present invention comprises a stop plug apparatus that enables a user to operate a flexible shaft attachment having a handpiece end to be coupled to a rotary tool in any position without risking disengagement of the flexible core member from the handpiece end.

DETAILED DESCRIPTION OF THE INVENTION

Figure 1:
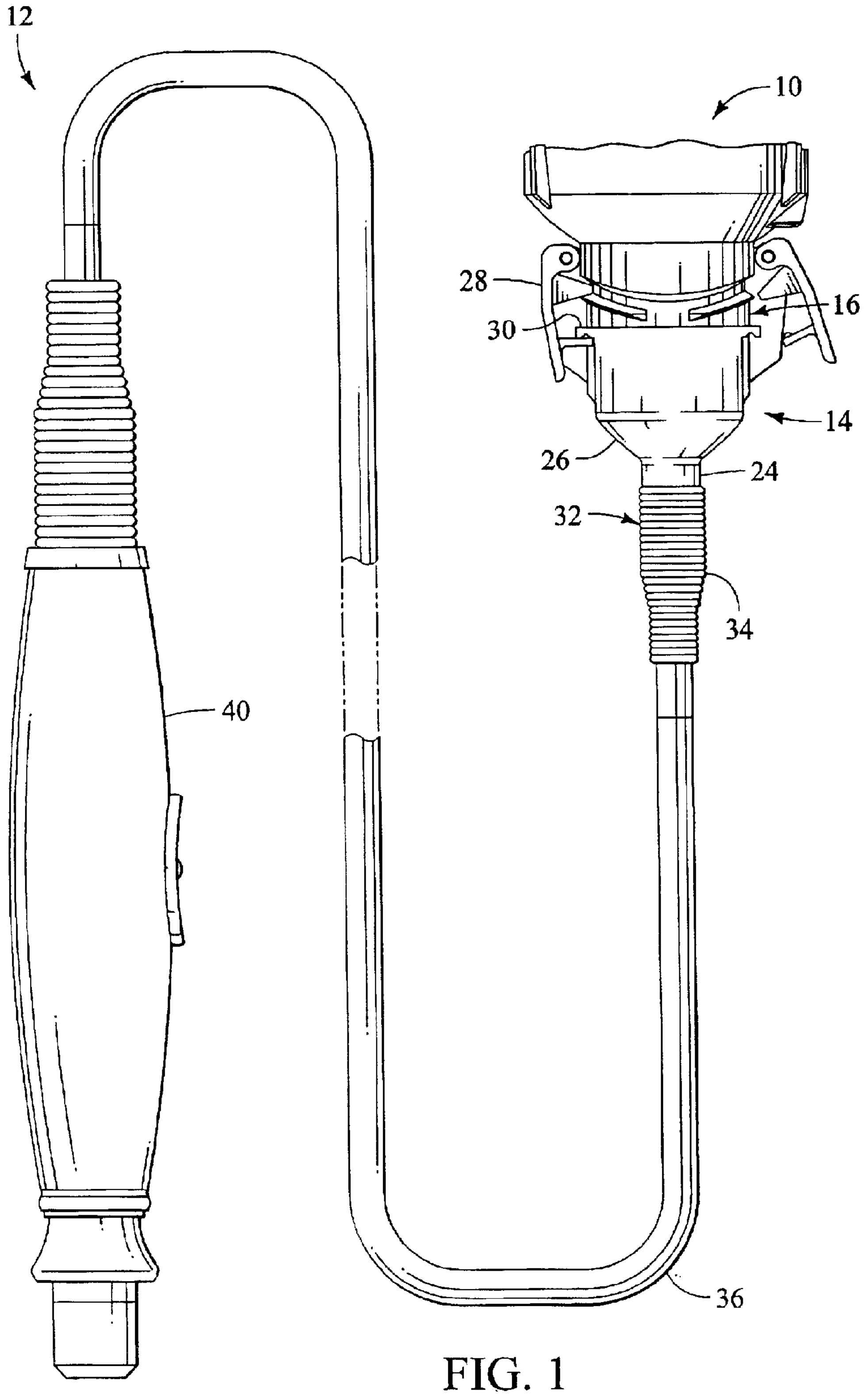
FIG. 1 is a side elevational view of the assembly in which the stop plug apparatus of the instant invention operates, and illustrates the flexible shaft attachment and rotary tool coupled to one another via the ferrule.
Figure 2:
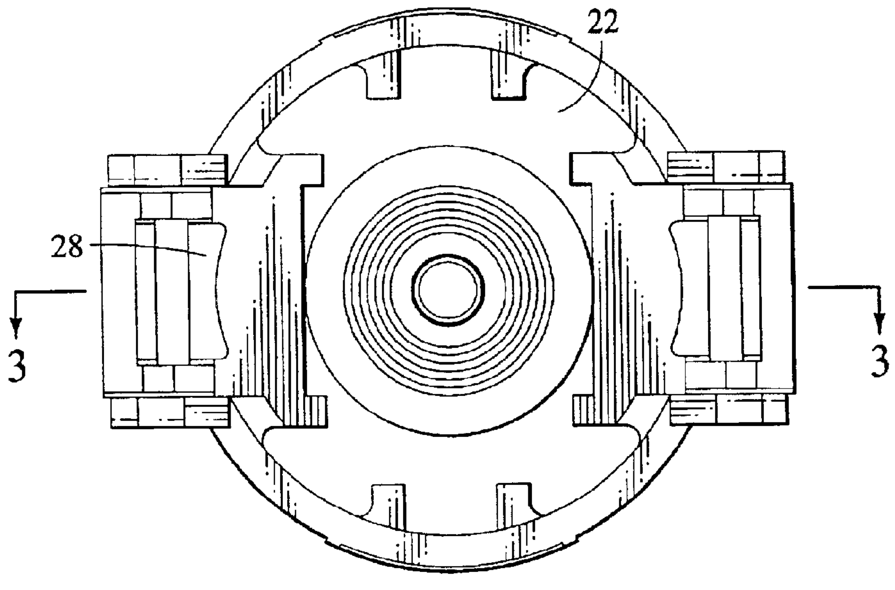
FIG. 2 is a top view of the assembly illustrated in FIG. 1.
Figure 3:
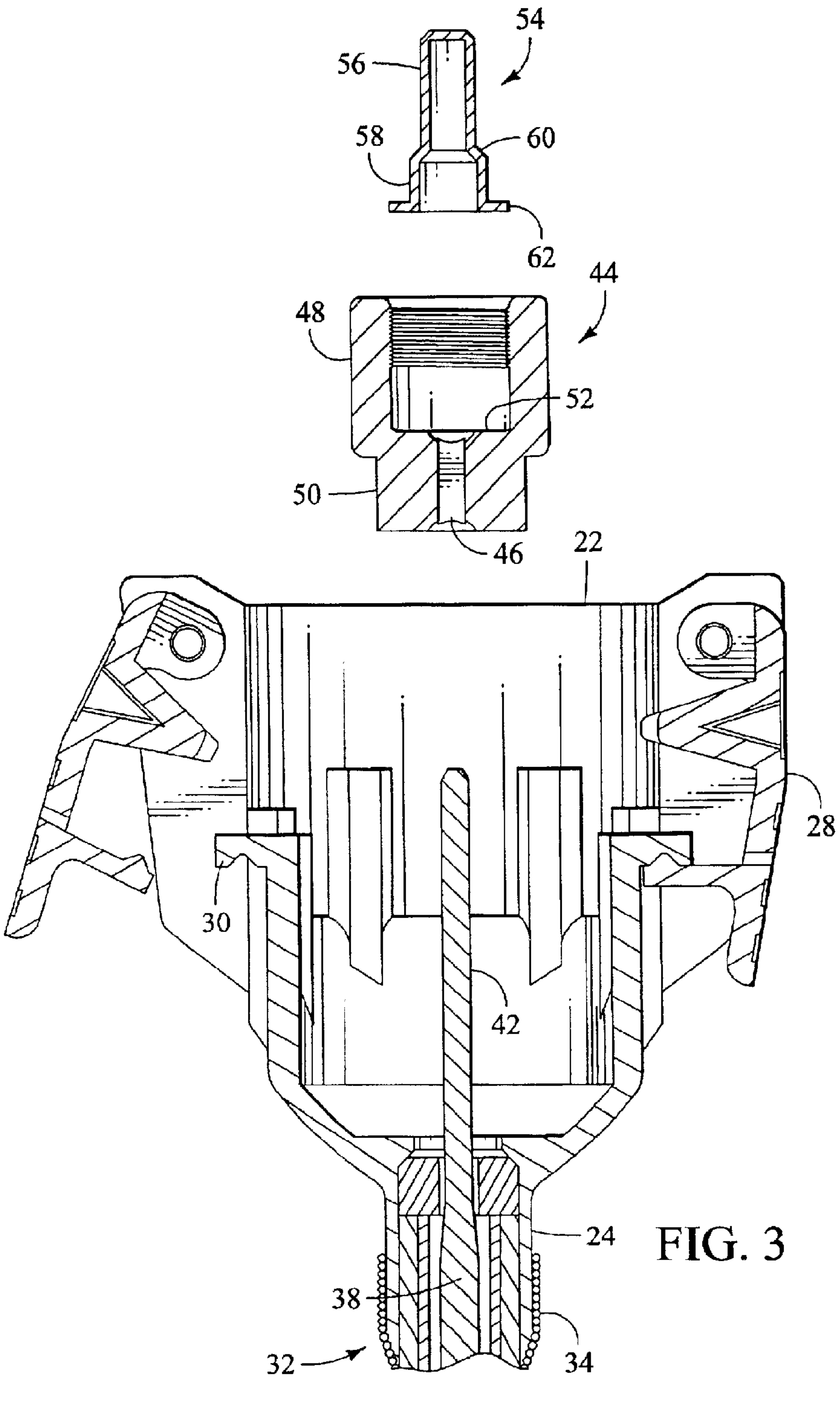
FIG. 3 is an exploded sectional view of the stop plug apparatus of the instant invention with the ferrule of FIG. 1, taken along the 3—3 line.

The preferred embodiment of the stop plug apparatus includes a generally cylindrical stop plug having an open end and a closed end, and a cylindrical chamber spanning therebetween, where the open end is configured to receive the flexible core member and the closed end prevents undesirable axial movement of the flexible core member of a flexible shaft into the output shaft of the rotary tool, which often results in disengagement of the flexible core member from the handpiece end.

Disengagement ordinarily occurs because the output shaft of the motorized drive unit has a predetermined internal depth and circumference, which shaft ordinarily has a collet inserted inside of it and a collet nut threaded on it. However, in applications wherein the output shaft is coupled directly to the flexible shaft attachment, the collet and collet nut are removed and the output shaft and flexible shaft attachment are directly threadedly connected to one another. Therefore, when modest force is applied to the core in the direction of the drive unit, the flexible core member disengages from the handpiece and slides into the output shaft of the rotary tool.

Alternative methods of preventing disengagement of the core from the handpiece have proven disadvantageous in view of the present invention. For example, lengthening the flexible core to extend between the handpiece and the distal end of the output shaft would necessarily preclude any axial movement between of the flexible core. However, this configuration is disadvantageous for numerous reasons. First, end portions at each end of the flexible core have square cross-sections to facilitate attachment and rotation of the flexible core at its ends. Lengthening the end portion at the driven end would require commensurate lengthening at the handpiece end so that the end portions would be balanced. Lengthening at the handpiece end would result in part of the square end portion at the handpiece end extending past the handpiece, and rotation of the square end portion within the flexible sheath causes undesirable friction. This friction can cause degradation and erosion of the flexible sheath, and unwanted vibrational movement of the square end portion interferes with the rotation of the core.

Additionally, the square end portions are formed using a die. The die, while forming a generally square shaped cross section on the end portions of the flexible core, does not form perfectly square shaped cross sections. Thus, there may exist a differential in mass at the corners of the square cross section, causing uneven rotation of the flexible core. This uneven rotation disrupts the operation of the rotary tool unit. Minimizing the length of this square shaped cross section is therefore desirable.

The instant invention is directed toward preventing disengagement of the flexible core member from the handpiece by placing the stop plug apparatus in the output shaft to limit axial movement of the flexible core member within the output shaft. The stop plug apparatus has a generally hollow, cylindrical body, an open end and a closed end, and a cylindrical chamber spanning between the ends. The open end of the stop plug preferably nests on an inside surface of a drive cap, which has an aperture at its center for matingly receiving an end of the flexible core member. The inside circumference of the drive cap is threaded to threadedly engage a threaded outside circumference of the output shaft. Thus, the stop plug is disposed within both the drive cap and the output shaft of the rotary tool, with closed end portion of the stop plug projecting into the cavity of the output shaft, while being prevented from sliding into the output shaft by an annular flange around the open end of the drive cap.

The flexible core member, which projects through the mating aperture of the drive cap and into the cavity of the stop plug, is therefore prevented from sliding axially into the output shaft by the closed end of the stop plug. In this manner, disengagement of the flexible core member from the handpiece is prevented.

Figure 4:
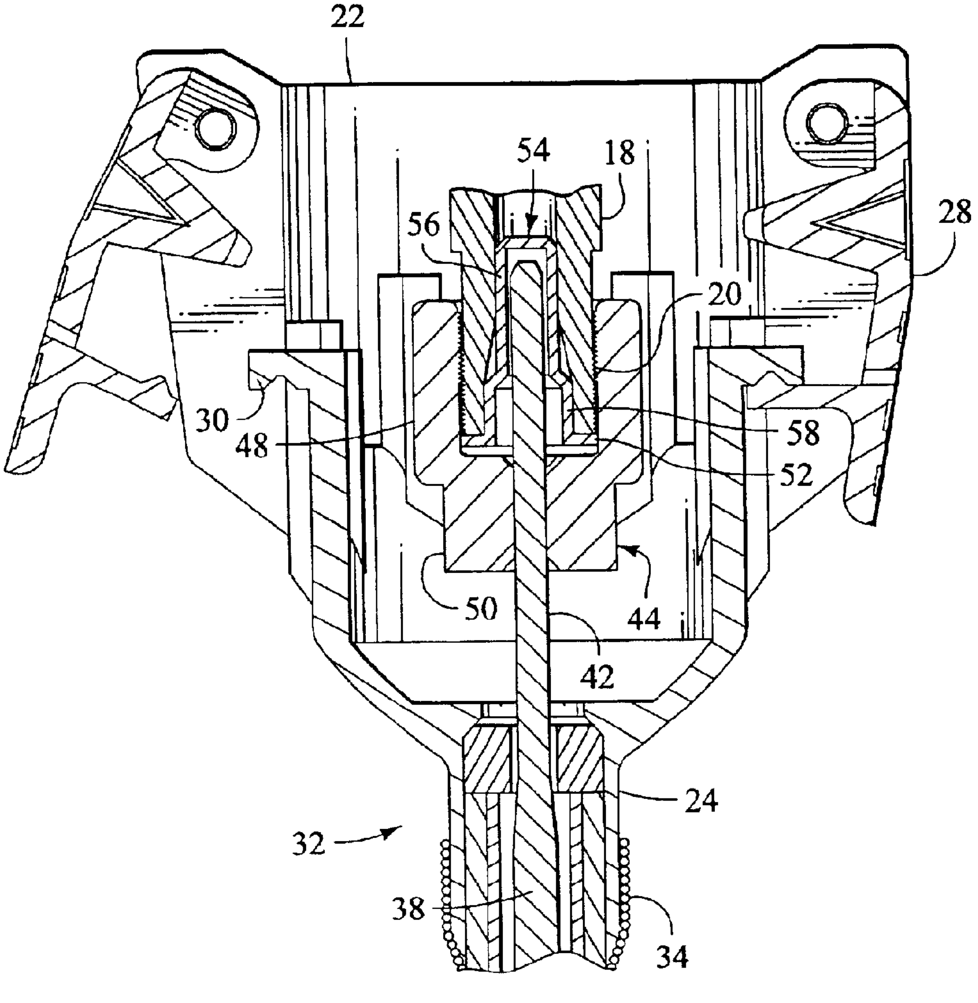
FIG. 4 is a sectional view of the stop plug apparatus of the instant invention assembled within the coupling device of FIG. 1, taken along the 3—3 line.
Figure 5:
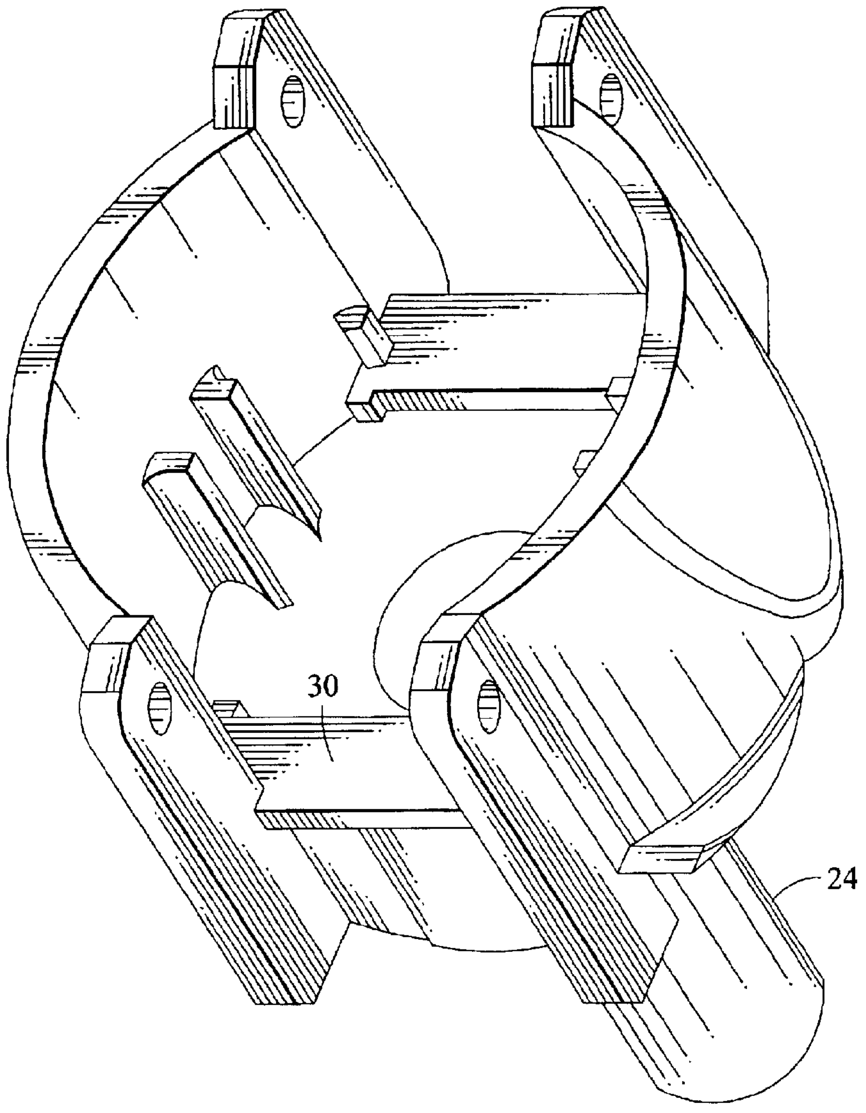
FIG. 5 is a perspective view of the coupling device of FIG. 1.
Figure 6:
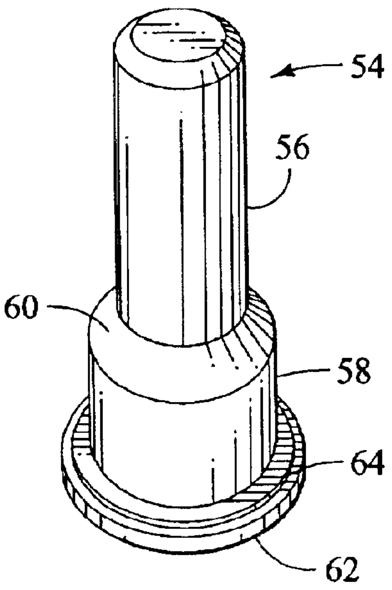
FIG. 6 is a perspective view of the stop plug apparatus of the instant invention.

Turning now to the drawings, the environment in which the preferred embodiment of the stop plug apparatus operates is illustrated in FIG. 1, where a rotary hand tool, indicated generally at 10, is shown coupled to a flexible shaft attachment, indicated generally at 12, via a coupling apparatus or ferrule, indicated generally at 14. The rotary hand tool 10 has a nose portion indicated generally at 16, and a rotary output shaft 18, which is best shown in FIG. 4, and is intended to be attachable to a working tool bit such as a small circular saw blade, a cutting bit, or the like.

While it is understood that the instant invention is related to a stop plug apparatus, the particular coupling attachment and rotary hand tool are only illustrated in the drawings to provide a sample environment for operation of the stop plug apparatus. Thus, the instant invention contemplates use with any rotary hand tool of the type having a generally cylindrical, hollow rotary output shaft 18 extending from the rotary tool drive unit 10, to which working tool bits are ordinarily attached by means of a collet and a collet nut (not shown). The rotary tool drive unit 10 for communicates rotational torque to various working tool bits. The rotary output shaft 18 includes an open end portion 20 having a threaded outer circumference. From its open end portion 20 toward the rotary tool drive unit 10, the output shaft 18 has a predetermined interior depth and an inner circumference that gradually narrows, and is configured to matingly receive a collet (not shown, but of conventional design), which has a circumference that is slightly larger than the narrowest portion of the inner circumference of the rotary output shaft. In this way, the collet is prevented from sliding into the predetermined interior depth of the rotary output shaft 18 by the narrowing inner circumference of the rotary output shaft. The collet is tightened against a tool bit shank in the understood manner by a threaded collet nut, which threadedly engages the threaded outer circumference of the rotary output shaft 18.

When a rotary hand tool is coupled to an accessory attachment, such as a flexible shaft attachment 12, a coupling device 14 is generally used to couple the rotary tool drive unit 10 to the attachment. In doing so, the collet and collet nut are removed so that the output shaft 18 can be mechanically coupled to the flexible shaft attachment 12, as will be described. The present invention contemplates use with any number of coupling devices, and should not be construed to be limited to the coupling device shown and described.

One such coupling device is illustrated in FIGS. 1, 3, 4 and 5. The coupling device 14 includes a mounting portion or ferrule having a generally hollow cylindrical body with an internal surface and an external surface. An open mounting end portion 22 has a circumferential opening in the ferrule and has a predetermined diameter configured to receive the nose portion 16 and rotary output shaft 18 of the rotary tool drive unit 10. Opposite the open mounting end portion 22 is a smaller open end portion 24 to which the attachment 12 is mounted, where the smaller open end portion has a smaller diameter than the diameter of the open mounting end portion. Separating the two open end portions is a conical transition portion 26, which is a sloped, funnel-shaped portion of the ferrule 14 that gradually narrows the diameter of the ferrule, and terminates in the generally cylindrical smaller open end portion 24.

When the nose portion 16 and rotary output shaft 18 are properly inserted into the open mounting end portion 22, opposing latch members 28 disposed on the outer circumference of the ferrule clamp down on and engage both the nose portion of the rotary tool to releasably secure the rotary tool drive unit 10 to the ferrule 14. When in the fully locked position, the latch members 28 also engage a shelf-like locking flange 30 of the ferrule, to releasably lock the latch members into the locked position. In this way, the coupling device is securely attached to the rotary tool.

To couple the flexible shaft attachment 12 to the ferrule 14, a lower portion of the cylindrical smaller open end portion 24 of the ferrule slidably engages a generally cylindrical mounting portion, designated generally at 32, of the accessory attachment 12. As illustrated in FIG. 1, the mounting portion of the accessory attachment 32, which includes a coiled spring 34, couples a hollow flexible rubber shaft 36, which houses a flexible core member 38, to the ferrule 14. The coiled spring 34 has an inner circumference that is slightly smaller than the outer circumference of the smaller open end portion 24 of the ferrule 14. Therefore, when the coiled spring 34 is mounted around the outer circumference of the smaller open portion 24, the resulting force fit maintains frictional engagement of the coiled spring 34 with the smaller open end portion 24 of the ferrule 14. The flexible core member 38 housed within the flexible rubber shaft 36 is consequently coupled to the ferrule 14 as well.

The flexible shaft 36 of the flexible shaft attachment 12 is generally hollow, and houses the generally cylindrical flexible core member 38, which terminates at a handpiece 40 of the flexible shaft attachment and at its driven end, within the rotary output shaft 18 in the ferrule. At its driven end, the flexible core member 38 contains an engagement portion 42, which includes a generally square-shaped, rather than cylindrical, circumference. Within the ferrule 14, disposed on the bottom of the internal surface, is a drive cap 44 having an axial aperture 46 therethrough for receiving the engagement portion 42 of the flexible core member 38. The aperture 46 of the drive cap is aligned with the opening of the smaller open end portion 24. The drive cap 44 includes a main portion 48, which is a generally cylindrical body having a uniform circumference, and a nut portion 50 that is unitary with the main portion. The transition between the main and nut portions 48, 50 forms an annular shelf or shoulder 52 on the inside of the drive cap 44. The aperture 46 of the drive cap 44 extends through both of the main and nut portions 48, 50. The nut portion 50 of the drive cap 44 abuts the bottom internal surface of the ferrule 14. Because the engagement portion 42 of the flexible core member 38 is square, the aperture 46 of the drive cap 44 is similarly sized and configured to have a square-shaped circumference that is slightly larger than that of the flexible core member 38. This mechanical configuration ensures that when the drive cap 44 is rotated, the flexible core member 38 inserted into the aperture 46 of the drive cap is consequently rotated.

Turning now to FIGS. 3, 5, 6 and 7, the stop plug apparatus embodying the instant invention is designated generally as 54. In the preferred embodiment, the stop plug apparatus 54 nests at least partially within the drive cap 44. Generally, a closed end portion 56 of the stop plug apparatus 54 protrudes into at least a portion of the output shaft 18 of the rotary tool drive unit 10, and an open end portion 58 abuts the internal shoulder 52 the drive cap 44. The distance from the open end portion 58 to said closed end portion 56 is less than the predetermined interior depth of the output shaft 18, and the stop plug apparatus 54 thereby limits the depth of penetration of the flexible core member 38 in the output shaft. The internal circumference of the drive cap 44 is threaded to threadedly engage the threaded outer circumference of the output shaft 18, which has already been decoupled from the collet nut used in other applications. Thus, when the rotary tool drive unit 10 and flexible shaft attachment 12 are coupled to one another via the ferrule 14, the rotary output shaft 18 is threadedly coupled to the drive cap 44 within the ferrule 14. In turn, the aperture 46 of the drive cap 44, which is aligned with the open end portion 58 of the stop plug apparatus 54, matingly receives the flexible core member 38 of the flexible shaft attachment 12. The flexible core member 38 is enclosed within the closed end portion 56, which protrudes into the output shaft 18 of the rotary tool drive unit 10.

However, because the flexible core member 38 must be free to rotate within the flexible shaft 36, this limits the manner in which the flexible core member 38 can be mounted and retained at its handpiece end. Consequently, the flexible core member 38 is only loosely mounted at its handpiece end, and when the handpiece end is raised above the horizontal plane at which the ferrule is located, gravity causes the flexible core member to disengage from the handpiece 40. The diameter of the flexible core member 38 is smaller than even the narrowest portion of the inner circumference of the rotary output shaft 18, and by force of gravity, slides or slips into the output shaft of the rotary tool drive unit 10.

Accordingly, the stop plug apparatus 54 is placed within the output shaft 18 of the rotary tool drive unit 10 to restrict or eliminate axial movement of the flexible core member in the direction of the rotary tool. The stop plug apparatus is preferably a plastic device, such as nylon filled glass, and includes a generally cylindrical body, the open end portion 58 and the closed end portion 56, and a cylindrical chamber extending therebetween. The closed end portion 56 has a first, relatively constant circumference, and the open end portion 58 has a second relatively constant circumference, where the first circumference is smaller than the second circumference. A sloped transition portion 60 separates the open end portion 58 from the closed end portion 56, which, as it slopes from the closed end portion to the open end portion, has a gradually increasing circumference. Thus, in the preferred embodiment of the instant invention, the transition portion 60 gradually and smoothly bridges the differential between the open end portion 58 and closed end portion 56. Among other things, this sloped transition portion 60 facilitates insertion of the stop plug apparatus 54 into the output shaft 18.

The closed end portion 56 of the stop plug apparatus, which has a smaller external circumference than the internal circumference of the output shaft 18, extends into the predetermined internal depth of the rotary output shaft. However, the outer circumference of the open end portion 58 is only slightly smaller than the internal circumference of the output shaft 18, and is thereby configured to frictionally engage the internal circumference of the output shaft. Further, because the internal circumference of the rotary output shaft 18 narrows along its depth, the fit between the outer circumference of the open end portion 58 and the inner circumference of the output shaft 18 becomes gradually tighter, increasing the frictional engagement of the stop plug apparatus 54 with the output shaft.

The open end portion 56 of the stop plug includes an aperture having an annular flange 62 surrounding its circumference, and the underside of the annular flange is a generally flat, planar surface. In operation, this planar surface abuts the internal shoulder 52 on the inside of the drive cap 44, and accordingly, has an outer circumference that is slightly smaller than the internal circumference of the drive cap, so that the stop plug apparatus 54 is configured to nest within the drive cap. Moreover, the annular flange 62 has an outer circumference that is slightly smaller than, or roughly equal to, the outer circumference of the output shaft 18, so that the annular flange 62 will not fit within the internal circumference of the output shaft, but will not interfere with the threading of the internal circumference of the drive cap 44 to the outer circumference of the drive shaft.

When inserted into the output shaft 18 of the rotary tool drive unit 10, a majority of the cylindrical chamber protrudes into the internal depth of the output shaft. Accordingly, the stop plug apparatus 54 is prevented from entirely slipping or sliding into the output shaft 18 in two ways. First, the frictional engagement of the open end portion 58 with the narrowing internal circumference forms a tight fit between the two, and second, the annular flange 62 surrounding the outer circumference of the open end portion is sized and configured to prevent its passing through the opening of the output shaft 18.

Figure 8:
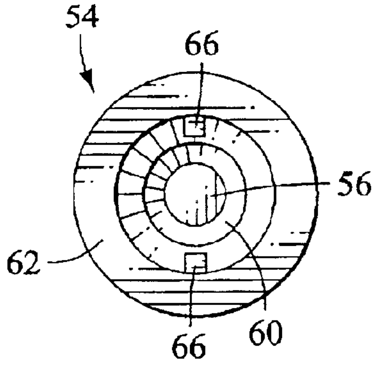
FIG. 8 is a bottom view of the stop plug apparatus of FIG. 6.
Figure 7:
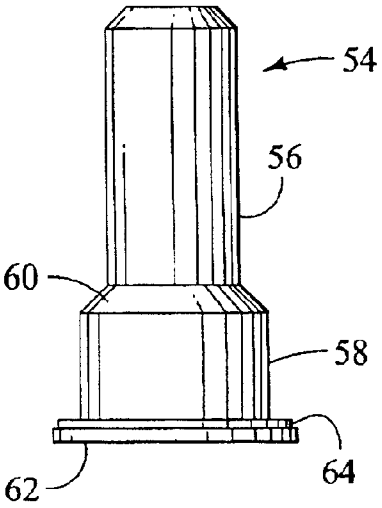
FIG. 7 is an elevational view of the stop plug apparatus of FIG. 6.
Figure 9:
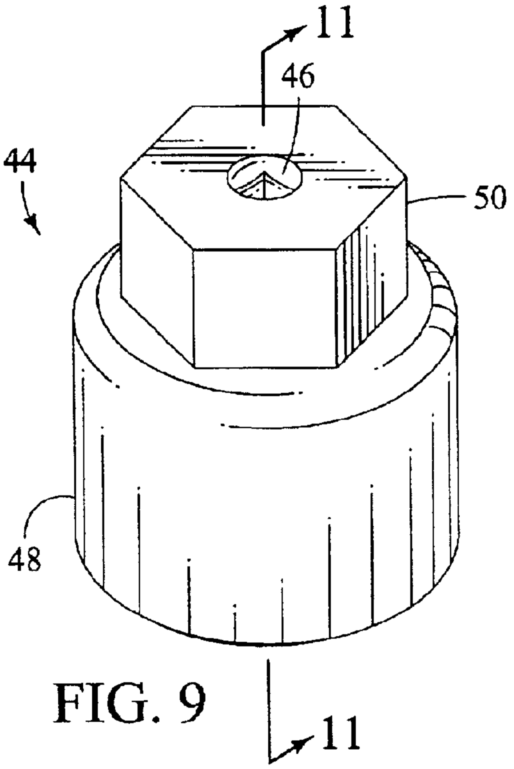
FIG. 9 is a perspective view of the drive cap of the assembly used in conjunction with the stop plug apparatus.
Figure 10:
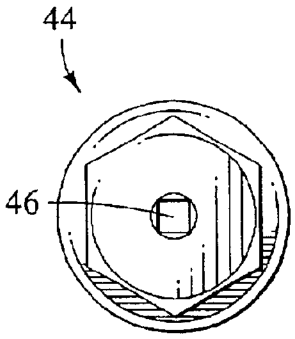
FIG. 10 is a bottom end view of the drive cap of FIG. 8.
Figure 11:
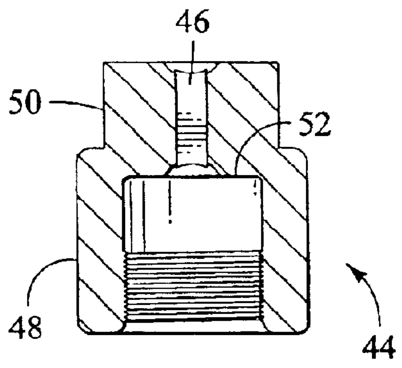
FIG. 11 is a section view of the drive cap of FIG. 8 taken along the 10—10 line.

The annular flange further 62 includes an annular groove 64 around its circumference in the preferred embodiment, although a less than circumferential annular groove is also contemplated by the instant invention. The annular groove 64 is provided so that when the user wants to remove the stop plug apparatus 54, the surface of the flange 62 will be uneven enough to allow the user to grab the flange and apply a moderate amount of force to remove the plug. The annular groove 64 contours the surface so that a fingernail or a tool can engage the surface to remove the plug. However, when the friction fit between the stop plug apparatus 54 and the output shaft 18 cannot be overcome by pulling on the annular flange 62, the stop plug apparatus is further provided with at least one and preferably two opposed, internally protruding ribs 66 (best shown in FIG. 8). The ribs 66 extend internally into the cylindrical chamber of the stop plug apparatus 54 at a predetermined distance that is large enough to allow pliers or other suitable tool to engage the rib, and allow the user to pull the plug from the output shaft 18, but are also small enough so as not to interfere with insertion of the flexible core 38 into the stop plug apparatus. The ribs 66 extend in the axial direction within the cylindrical chamber from the annular flange to the transition portion of the stop plug apparatus 54.

Once the stop plug apparatus 54 is inserted into the output shaft 18, the drive cap 44 can be threaded to the output shaft of the rotary tool drive unit 10. Alternatively, the stop plug apparatus 54 can first be nested within the drive cap 44, and the assembly of the stop plug apparatus and drive cap can be subsequently threaded to the output shaft 18.

When the flexible shaft attachment has been secured to the smaller end portion 24 of the ferrule 14, the engagement portion 42 of the flexible core member 38 protrudes into the cavity of the ferrule. When the drive cap 44 and stop plug apparatus 54 are in place, the flexible core member 38 protrudes through the corresponding aperture 46 in the drive cap, into the cylindrical chamber of the stop plug apparatus. The sloped nature of the transition portion 60 helps to guide the tip of the flexible core member 38 into the narrower closed end portion 56, where it is unable to extend past the closed end. Thus, once the entire assembly is inserted into the output shaft 18 of the rotary tool drive unit 10, axial movement of the flexible core member into the output shaft 18 is prevented insofar as the closed end portion 56 restricts such axial movement. The predetermined length of the stop plug apparatus 54 in nesting engagement with the drive cap 44 therefore corresponds to the length of the flexible core member 38 that may extend into the ferrule 14.

While a particular embodiment of the present stop plug apparatus has been described herein, it will be appreciated by those skilled in the art that changes and modifications may be made thereto without departing from the invention in its broader aspects and as set forth in the following claims.

What is claimed is:

1. Apparatus for preventing disengagement of an axially movable and rotatable flexible core of a flexible shaft attachment having a driven end and a handpiece end, the driven end having a ferrule for attachment to a rotary power tool having an exteriorly threaded hollow output shaft with a first predetermined interior depth for receiving the base end of tool bits that can be used with the power tool, the flexible shaft attachment having a drive cap attached to the output shaft, the drive cap having an aperture sized and shaped for receiving the core in fixed rotating engagement, said apparatus comprising:

a generally cylindrical stop plug having an open end portion and a closed end portion, a cylindrical chamber extending from said open end portion to said closed end portion, with said open end portion having an outward extension adapted to engage the end of the output shaft and be held in place by the attached drive cap, the chamber being capable of receiving the core therein;

wherein the distance from said open end portion to said closed end portion is less than the first predetermined interior depth, said stop plug thereby limiting the depth of penetration of the core in the output shaft.

2. The apparatus of claim 1 wherein said inner circumference of the drive cap is threaded to threadedly engage the output shaft of the rotary tool.

3. The apparatus of claim 1 wherein an outer circumference of said open end portion of said stop plug is larger than an outer circumference of said closed end portion of said stop plug.

4. The apparatus of claim 1 wherein said closed end portion of said stop plug includes an annular flange configured to engage an internal shoulder of the drive cap.

5. The apparatus of claim 1 wherein said stop plug further includes an internal surface having at least one internally protruding rib to allow removal of said apparatus from the output shaft.

6. The apparatus of claim 5 wherein said at least one internally protruding rib comprises two opposed protruding ribs.

7. The apparatus of claim 1 wherein said stop plug further includes a transition portion having a sloped surface for facilitating penetration by said closed end portion of said stop plug into the output shaft.

8. The apparatus of claim 1 wherein said stop plug further includes an annular flange having a width approximately equal to or no greater than an external diameter of the output shaft.

9. The apparatus of claim 8 wherein said annular flange includes an outer circumference, said outer circumference having a groove around at least a portion thereof.

10. The apparatus of claim 1 wherein said stop plug includes an outer diameter of said open end portion that is slightly less than the internal diameter of the output shaft for a frictional fit of said outer diameter of said stop plug and the internal diameter of the output shaft.

11. Apparatus for preventing disengagement of an axially movable and rotatable flexible core of a flexible shaft attachment having a driven end and a handpiece end, the driven end having a ferrule for attachment to a rotary power tool, the tool having an exteriorly threaded hollow output shaft with a first predetermined interior depth for receiving the base end of tool bits that can be used with the power tool, the flexible shaft attachment having a drive cap attached to the output shaft, the drive cap having an aperture sized and shaped for receiving the core in fixed rotating engagement, said apparatus comprising:

receiving means within the drive cap for receiving a driven end of the core;

plugging means within the drive cap for restricting axial movement of the driven end of the core; and said plugging means having an engagement means between the output shaft and the drive cap for engaging the output shaft.

12. The apparatus of claim 11 wherein said receiving means comprises an open end portion of said apparatus and said plugging means comprises a closed end portion of said apparatus.

13. The apparatus of claim 11 wherein said engagement means comprises a open end portion of said apparatus that has an outer circumference that is greater than a circumference of said closed end portion but is slightly smaller than an inner circumference of the output shaft so as to frictionally engage the output shaft.

14. The apparatus of claim 11 further comprising securing means for preventing slippage of said apparatus into the output shaft.

15. The apparatus of claim 14 wherein said securing means comprises an annular flange surrounding said outer circumference of said open end portion, said annular flange having an outer circumference that is approximately equal to the outer circumference of the output shaft.

16. The apparatus of claim 11 further comprising removing means for removing said apparatus from the output shaft.

17. The apparatus of claim 16 wherein said removing means comprises an annular groove within an annular flange on an outer circumference of said open end portion.

18. The apparatus of claim 16 wherein said removing means comprises a pair of internal opposed ribs configured and arranged on an inside surface of said apparatus to oppose one another.

19. The apparatus of claim 11 further comprising insertion means.

20. The apparatus of claim 19 wherein said insertion means comprise a sloped transition portion for guiding the core into said apparatus.

* * * * *